June 16, 1964 J. D. LINCOLN 3,137,602
CERAMIC HONEYCOMB
Filed Aug. 21, 1959 2 Sheets-Sheet 1

INVENTOR.
JOHN D. LINCOLN
BY
Mason, Porter, Diller & Stewart
ATTORNEYS

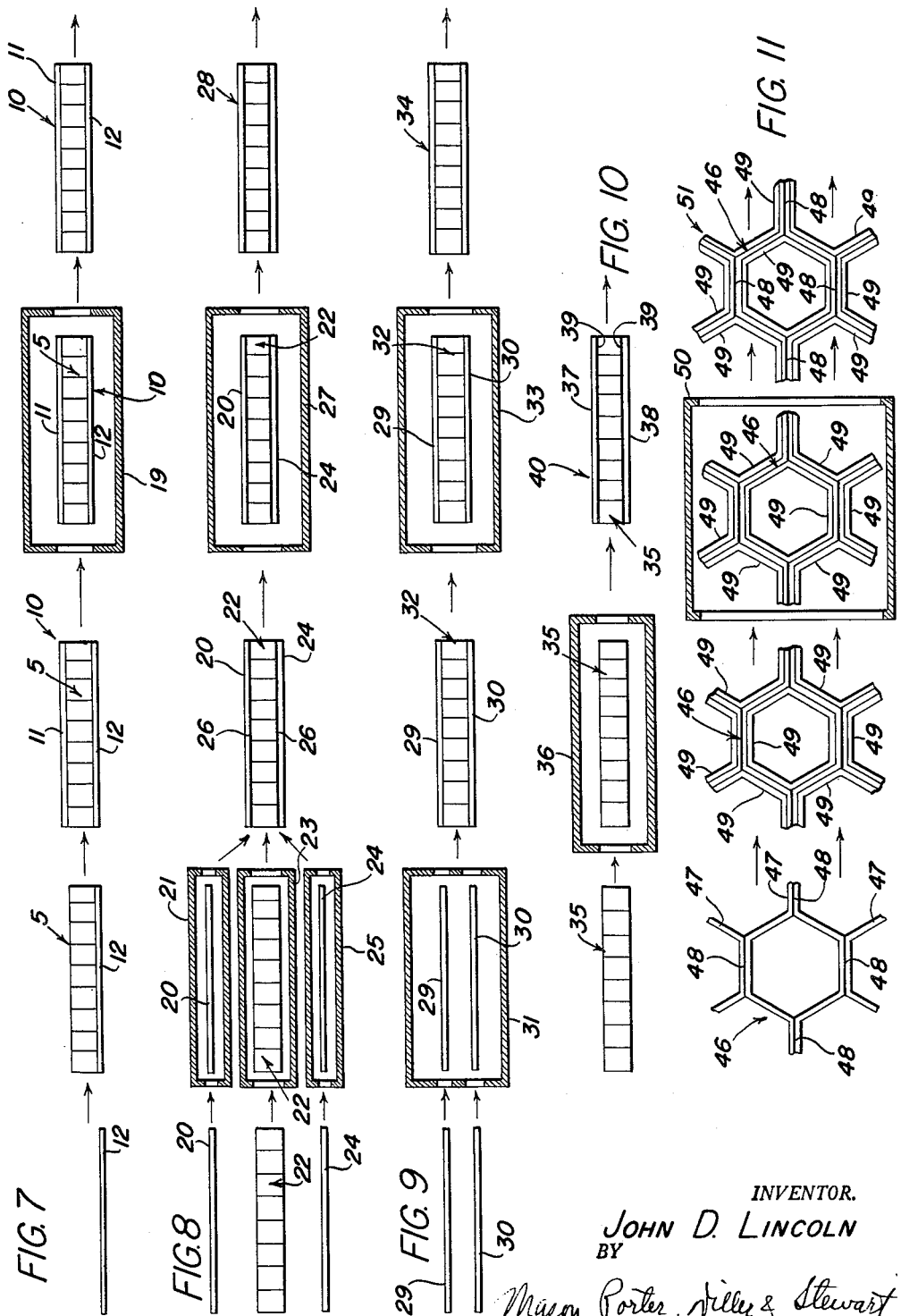

United States Patent Office 3,137,602
Patented June 16, 1964

3,137,602
CERAMIC HONEYCOMB
John D. Lincoln, Mount Vernon, Ohio, assignor to Continental Can Company, Inc., New York, N.Y., a corporation of New York
Filed Aug. 21, 1959, Ser. No. 835,290
1 Claim. (Cl. 156—89)

This invention relates in general to new and useful improvements in honeycomb structures, and more particularly seeks to provide novel honeycomb structures which are formed of materials that will withstand relatively high temperatures.

It has been found that honeycomb panels and other shapes of honeycomb structures will provide a relatively high strength-to-weight ratio. At the present time, honeycomb panels are being used in aircraft construction, and other types of construction utilizing honeycomb panels are contemplated. Such panels normally utilize a core either formed of thin metal stock connected together, or a fibrous product, such as paper, which has been coated with a hardening material, such as a suitable resin. While these honeycomb products have proven to be very satisfactory for their present purposes, because of the types of materials utilized therein, they are not suitable for installations where high temperatures are encountered.

The present invention contemplates the use of honeycomb structures for light weight members which are subjected to high temperatures, for example, the nose cones of missiles. Employing the basic concepts of honeycomb structures, it is proposed to form honeycomb structures from heat resistant materials, such as ceramics, wherein a relatively light weight, high strength and heat resistant structure may be provided.

Another object of the invention is to provide a honeycomb structure which is capable of withstanding high temperatures, the honeycomb structure being principally formed of ceramic material and including a core which is formed of a plurality of short lengths of extruded tubing, which tubing has been assembled in nested relation and connected together into a rigid core, after which inner and outer facing sheets have been applied thereto to form a structural unit.

Another object of the invention is to provide a honeycomb structure wherein the core is formed of a plurality of short lengths of tubing, the lengths of tubing being susceptible to being combined together to form a core which has compound face surfaces.

Still another object of the invention is to provide a composite structure which may be formed of ceramic and other materials, including metals, such as steel, wherein the structure may have the necessary heat resistant properties and at the same time may be suitably secured to other structural components having the required strength properties, so that a device may be formed having the required combined heat resistance and structural strength properties. A typical example of such a structural device would be a missile body which may require a nose cone capable of withstanding high temperatures, which nose cone must be connected to structural members of high strength formed of metal.

A further object of the invention is to provide a honeycomb structure which is formed of an inner and an outer facing layer with a honeycomb core disposed therebetween, the facing layer having compound surfaces and the core being formed of individual tubes which are disposed in nested relation between the facing layers and conform to the general compound surface configuration of the facing layers.

Still another object of the invention is to provide a honeycomb structure which is capable of withstanding relatively high temperatures, the honeycomb structure including a honeycomb core which is formed of a coated fibrous material, the fibrous material being of a heat resistant material, such as asbestos and fibre glass, and the coating material being of a heat resistant material, such as a frit material formed of powdered silicates and a cement-sodium silicate mixture.

Still a further object of the invention is to provide a novel method of forming a heat resistant honeycomb structure, which method includes the step of shaping facing layers or sheets, preferably of a heat resistant material such as a ceramic, and placing between the facing layers a core which is formed of ceramic, the core being a composite structural member formed of a plurality of extruded ceramic tubes disposed in nested relation, and then bonding the facing layers to the honeycomb core by such methods, including the firing of the entire honeycomb structure, to obtain self-bonding of the components thereof through vitrification of the materials.

With the above, and other objects in view that will hereinafter appear, the nature of the invention will be more clearly understood by reference to the following detailed description, the appended claim, and the several views illustrated in the accompanying drawings:

In the drawings:

FIGURES 7, 8, 9 and 10 are schematic views showing various methods of making different forms of heat resistant honeycomb panels in accordance with the invention.

FIGURE 11 is a schematic view showing the steps employed in forming a modified form of honeycomb core.

Figure 3:
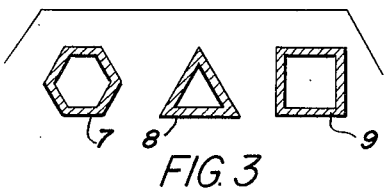
FIGURE 3 is an enlarged sectional view taken through other ceramic tubes showing the various cross-sections which may be employed.
Figure 4:
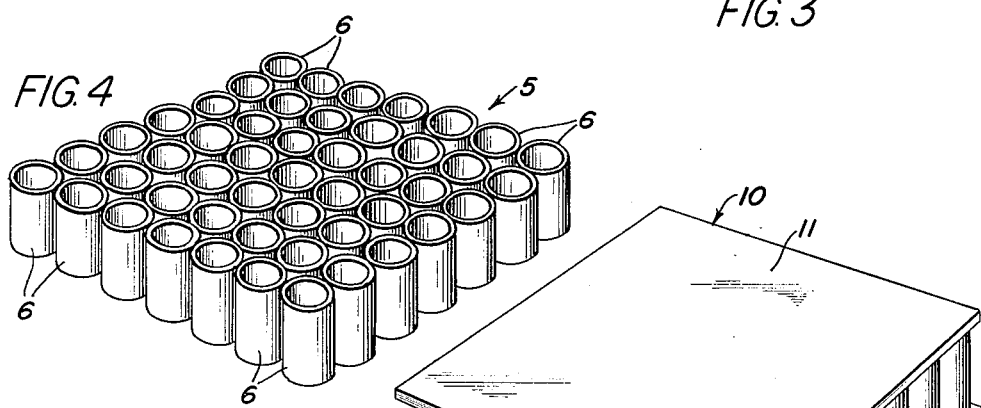
FIGURE 4 is a perspective view showing a honeycomb core formed of a plurality of the tubes of FIGURE 2.

In accordance with the invention, it is proposed to provide a honeycomb structure with high heat resistant properties, the honeycomb structure being formed either entirely of ceramic materials or at least in part of ceramic materials. A typical ceramic honeycomb core, in accordance with the invention, is illustrated in FIGURE 4, and is generally referred to by the numeral 5. The honeycomb core 5 is formed of a plurality of individual tubes 6 which are disposed in abutting relation and bonded to each other. The tubes 6 are illustrated as being of a circular cross-section. However, as is shown in FIGURE 3, the tubes may be of other cross-sections, such as the hexagonal tube 7, the triangular tube 8, and the square or rectangular tube 9.

Figure 5:
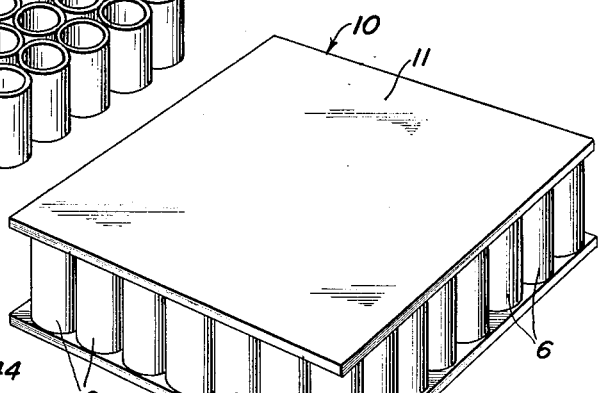
FIGURE 5 is a perspective view showing a honeycomb panel or sandwich utilizing the honeycomb core of FIGURE 4.

Reference is now made to FIGURE 5 in particular, wherein a honeycomb panel, generally referred to by the numeral 10, incorporating the honeycomb core 5 is illustrated. The honeycomb panel 10 also includes facing layers 11 and 12 which are bonded to the honeycomb core 5. Depending upon the desired strength and heat resistant properties, the material of the facing layers 11 and 12 will vary, although it is primarily proposed to form the facing layers 11 and 12 of either ceramic materials or suitable metals.

The nature of the ceramic material utilized will depend upon the particular requirements of the honeycomb structure of which it is a part. It is proposed to utilize such ceramic materials as natural clays and synthetic clays. A suitable synthetic clay is "Diamonite," which is a blend of aluminum oxide (over 99.5%) and other metal oxides (chiefly chromium oxide). Suitable natural clays are talc, kaolin, ball clay, fire clay and refractory clay.

In the fabrication of the tubes for forming the honeycomb core 5, the natural clay or the alumina blend is mixed with sufficient water to form a "stiff mud" of a consistency suitable for extruding through a die of the selected conformation. Typically, this requires an addition of 12% to 15% of water, by weight, in addition to any water of hydration already part of the chemical composition.

Figure 1:
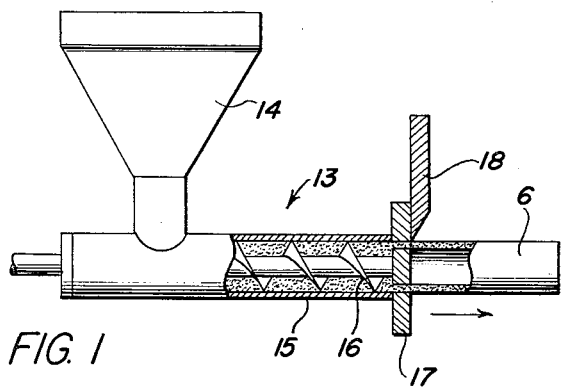
FIGURE 1 is a schematic elevational view of an extruder, and shows the manner in which tubes are formed of ceramic material for the purpose of forming a ceramic honeycomb core, portions of the extruder being broken away and shown in section.
Figure 2:
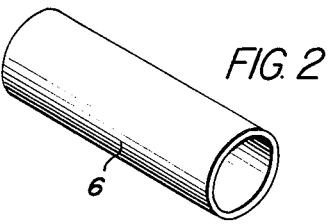
FIGURE 2 is an enlarged perspective view of a tube formed with the extruder of FIGURE 1.

The "stiff mud" is extruded in a typical extruder illustrated in FIGURE 1, and generally referred to by the numeral 13. The extruder 13 is illustrated as including a hopper 14 for the materials to be extruded, a barrel 15 and an auger 16, although, of course, it may utilize a piston type plunger in lieu of the auger 16. A die 17 is disposed at the exit end of the barrel 15 for shaping the ceramic material as it extrudes from the barrel 15 into the desired shape, such as the tube 6. After the desired length of tube 6 has been extruded, a knife 18 is actuated to shear off the individual tubes 6 so that they assume the shape illustrated in FIGURE 2. Extrusion under a vacuum condition is preferred to minimize trapped air and thus provide a more homogeneous part that will exhibit better "green" strength.

In the formation of the facing layers 11 and 12, somewhat less moisture is added (for example, 5%) and the somewhat "stiffer mud" is formed in the desired shape by compressing it into a simple mold of the correct dimensions and contours. The pressure required in molding the facing layers 11 and 12 is nominal. Flat sheets, such as those shown in FIGURE 5, require only smoothing in the mold to remove excess material. For curved molds to form facing layers having compound surfaces, which will be described in detail hereinafter, a manually operated arbor press is adequate for the purpose, but hydraulically operated presses exerting 100 to 200 p.s.i. will, of course, simplify and speed up the operation.

The "green" components must be first dried prior to firing to eliminate the excess water. This drying of all formed components is done slowly and at relatively low temperatures in order to avoid cracking and deformation. The actual air temperatures will depend on the time, whether or not an oven having separate heat zones is used, the size and geometry of the component, and air velocities in the oven. Temperatures in the range of 150° to 300° F. will be typical, with the higher temperatures being applied at the end of the drying period which might be one-half an hour to 24 hours, depending on the above-mentioned factors.

It is to be understood that the loss of the "mechanically" held water from the various mixes results in substantial shrinkage of parts, and allowance must be made for this in the initially extruded or molded part. A second, but lesser, shrinkage occurs during the subsequent firing stage. Since the exact total shrinkage will depend on the material used, the drying and curing cycles used, and the geometry of the piece, it can only be estimated in advance. For producing precision parts, the final dimensions of the intial mold to produce the desired product may be determined by actual trial and error tests.

The actual firing of clays, both natural and artificial, involves three stages, all taking place in sequence in a kiln as the temperature is raised. As the heat increases from the ambient, the clay first loses chemically held water (water of hydration) and carbon dioxide from any carbonates present. These losses are substantially complete by the time the material reaches 325° C. An oxidizing stage becomes predominant up to about 900° C., at which point vitrification is initiated.

The converision of a clay to a hard ceramic product is primarily the result of vitrification and up to a point, increased vitrification results in improved physical and chemical properties. However, excessive vitrification results in rapid deterioration of the product. The temperature for obtaining optimum vitrification has been determined for most clays by actual measurement of various physical properties of products fired under a wide variety of conditions and it has been found that the optimum firing temperature is fairly critical for each type of clay. Typical ball clays are preferably fired at 1180° to 1260° C., although a few types of ball clays require up to 1410° C. Fire clays are commercially fired at 1515° to 1595° C., and refractory clays at a minimum of 1605° C. The artificial clays, such as alumina blends including "Diamonite" are fired at temperatures in excess of 1650° C.

The time at which a ceramic item is held at the indicated temperature is again a function of the geometry of the particular ceramic piece. However, vitrification being non-ionic, it is a very slow process, and the low heat conductivity of clays results in slow heat penetration from the surfaces to the center of sections. Therefore, this period of firing is always a matter of hours, and may run from three hours to forty hours, or even more in the case of extremely heavy sections.

At this time, it is pointed out that although the honeycomb core 5 and the facing layers 11 and 12 may all be formed of ceramic materials, the ceramic materials need not all be the same. However, when the ceramic materials are the same, the entire honeycomb panel 10 may be fired as a unit. Reference is particularly made to FIGURE 7, wherein the steps of forming the honeycomb panel 10 are schematically illustrated.

In the formation of the honeycomb panel 10, the facing layer 12 is first formed, after which the honeycomb core 5 is assembled thereon. Then, the facing layer 11 is applied over the honeycomb core 5. The assembled panel 10 is then placed in a suitable oven, diagrammatically illustrated and referred to by the numeral 19, wherein the entire honeycomb panel 10 is simultaneously fired and the clay product from which the individual components are formed are vitrified. In this manner, the honeycomb core 5, the facing layer 11 and the facing layer 12 are self-bonded together during the vitrification process.

In FIGURE 8, the method of forming a ceramic honeycomb panel wherein the individual components thereof are formed of different materials is schematically illustrated. A facing layer 20 is formed and is fired in a furnace or kiln 21. A ceramic honeycomb core 22 is formed and is fired in a kiln 23. A second facing layer 24 is formed and separately fired in a kiln 25. The ceramic facing layers 20 and 24 and the ceramic honeycomb core 22 are then assembled with a suitable frit 26 being applied to the mating surfaces of the facing layers 20 and 24 and the honeycomb core 22. The assembled panel is then placed in a further kiln 27 and the assembly is fired at a temperature which will result in the vitrification of the frit 26 so that the frit 26 may bond together the ceramic components of the panel to form a composite ceramic honeycomb panel, generally referred to by the numeral 28. The frit material will be preferably in the form of powdered silicates, and will vary depending upon the particular vitrification temperatures of the ceramic components. The firing temperatures for the frits will vary from 900° to 1800° F. It is also proposed to utilize a ceramic material having a vitrification temperature below that of any of the three components of the honeycomb panel. At this time, it is also pointed out that in accordance with the invention, it is also proposed to utilize an inorganic adhesive, such as cement or sodium silicate, which may require a baking operation, although certain of these adhesives will also set at room temperature and no oven would be required for the bonding process.

In FIGURE 9, another mode of forming a ceramic honeycomb panel is diagrammatically illustrated. A pair of facing layers 29 and 30, which will be of the same ceramic material, are placed in a kiln 31 and fired. The facing layers 29 and 30 are then assembled, together with a "green" honeycomb core 32 having a lower vitrification temperature than that of the facing layers 29 and 30. The assembled panel is then placed in a kiln 33 where it is fired at the vitrification temperature of the honeycomb core 32. In so doing, the honeycomb core 32 is self-bonded to the facing layers 29 and 30 to form a ceramic honeycomb panel generally referred to by the numeral 34.

Although in FIGURE 9, the facing layers 29 and 30 have been illustrated as being formed of the same material and fired simultaneously in the same kiln 31, it is to be understood that the facing layers 29 and 30 may be formed of different materials and fired separately, after which they are combined with the honeycomb core 32 and fired in the kiln 33. Further, it is to be understood that the honeycomb core 32 may be of a material which vitrifies at a higher temperature than the facing layers 29 and 30, in which event, the honeycomb core 32 will be first fired, the facing layers 29 and 30 assembled therewith, after which the assembly will be fired in the kiln 33. In addition to these modifications, it is envisioned that it may be desired to form the honeycomb core and one of the facing layers of the same material, in which event the two could be bonded together by the vitrification thereof, after which the second facing layer would be assembled therewith and the assembly fired to finally form the honeycomb panel 34. A still further modification would be to first fire the facing layer 29, add the honeycomb core 32 thereto and fire this subassembly, and then add the facing layer 30, and fire the completed assembly.

Reference is now made to FIGURE 10, wherein a honeycomb core 35 is formed of a suitable clay, after which it is placed in a kiln 36 and fired. The honeycomb core 35 is then assembled with a pair of facing layers 37 and 38 and suitably bonded thereto with a bonding material 39 to form a honeycomb panel, generally referred to by the numeral 40. In forming the honeycomb panel 40, it is proposed to utilize facing layers which are of a material other than ceramic. The facing layers 37 and 38 may be metallic (aluminum or stainless steel, for example), asbestos composition, or a re-inforced plastic (phenolic or polyester re-inforced with glass or asbestos). The bonding material 39 will preferably be in the form of an inorganic adhesive, such as phenolic, polyester, and epoxide, or an isocyanate. These same adhesives may also be utilized for the purpose of bonding ceramic facing layers to a ceramic honeycomb core. Also, in accordance with the invention, the facing layers 37 and 38 need not be of the same material, and the material of one of the facing layers may be ceramic, if desired.

The thickness of the components from which the individual honeycomb panels are formed will vary depending upon the particular structural requirements of the honeycomb panel and the materials used. Although there is no theoretical minimum or maximum limit as to the thickness of the ceramic components, practical considerations indicate a minimum thickness of 0.015 inch and a maximum thickness of 0.250 inch.

Figure 6:
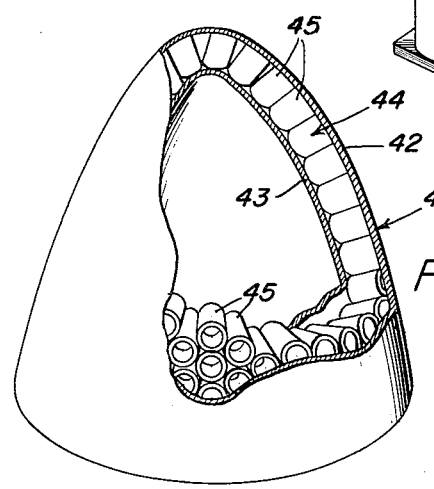
FIGURE 6 is a perspective view with portions broken away and shown in section of a nose cone which is formed in accordance with the invention.

It is to be understood that the invention is not limited to planar structures, such as the honeycomb panels illustrated in FIGURES 5 and 7 through 10, inclusive. In FIGURE 6, a nose cone for a missile, the nose cone being generally referred to by the numeral 41, is illustrated. The nose cone 41 includes an outer facing layer 42 and an inner facing layer 43, which are molded of suitable clay material and which have disposed therebetween a honeycomb core 44, also formed of a suitable clay material. The honeycomb core 44 is formed of a plurality of extruded tubes 45, such as any one of the tubes 6, 7, 8 and 9. It is not necessary that the facing layers 42 and 43 be equally spaced from each other at all points, since the length of the tubes 45 may be varied as required. The preferred method of making the nose cone 41 will be to assemble the tubes 45 within the outer facing layer 42. However, if desired, the individual components of the nose cone 41 may be separately formed and fired, after which they may be bonded together in any one of the previously described manners. The assembling of the tubes 45 within the outer facing layer 42 or about the inner facing layer 43 would eliminate the necessity of a mold or template for laying up the honeycomb core 44.

Reference is now had to FIGURE 11, wherein the steps followed in the formation of a modified form of honeycomb core are schematically illustrated. A suitable cellular re-inforcing material, generally referred to by the numeral 46, is first provided. The re-inforcing material is preferably laid up in sheet form and is formed of a plurality of individual sheets 47 which are bonded together by a suitable adhesive 48 which connects the individual sheets 47 together at spaced intervals along node lines. The cellular re-inforcing 46 is preferably laid up in the form of a block, after which the desired thickness of slice is cut from the block and the slice expanded so that the cellular re-inforcing appears as illustrated to the left in FIGURE 11. The preferred materials for the sheets 47 are asbestos and glass fabric. The adhesive 48 may be either organic or inorganic, and the adhesives which have been used successfully in making the cellular re-inforcing material 46 of asbestos include resorcinol and phenolic resins, and sodium silicate. The resorcinol resins are in general preferred.

It has been found possible to produce a strong fire-resistant honeycomb core by impregnating and/or coating the asbestos re-inforcing material 46 with inorganic materials, including frit and a cement-sodium silicate complex. In both cases, the inorganic material is suspended in a water slurry, and the asbestos cellular re-inforcing material 46 is dipped into this heavy slurry so that the inorganic materials are deposited on the surface and between the fibers of the asbestos material, as is shown in the second part of FIGURE 11, the inorganic material being designated by the numeral 49. Moisture is, of course, absorbed by the asbestos re-inforcing material, and it is necessary to eliminate this moisture by a drying operation.

In the case of the frit material, powdered silicates are preferred. When using this material, it is necessary to fuse it so that it will flow and form a continuous coating of "porcelain enamel." The temperature required to accomplish this fusion of the frit will, of course, depend upon the particular frit composition used, and the recommendations of the manufacturer thereof; but in general, it will be in the range of 900° to 1800° F. The fusing of the frit material is accomplished by passing the coated cellular reinforcing material 46 through an oven 50 at which time the re-inforced honeycomb core 51 is formed.

In the case of coating the asbestos re-inforcing material 46 with a cement-sodium silicate mixture, either a Portland cement or an aluminite cement may be used. A typical formulation would require 50 parts of the powdered cement, 90 parts of a commercial sodium silicate solution, 10 parts water, and 10 parts of trisodium phosphate, all by weight. In another formulation, that has proven successful, a mixture of 50 parts of powdered aluminum cement and 50 parts of a commercial sodium silicate solution has been used, but it should be understood that the precise formulation of the sodium silicate will depend upon its source. In this case, only a minimum amount of material is mixed at one time, since it has a fairly short pot life. Also, because of this short pot life at room temperature, it is not necesary to fire the product, but merely provide for drying the excess moisture from the product either at room temperature or at a slightly elevated temperature while the complex reaction between the sodium silicate and the cement sets up a strong fire resistant coating on the asbestos re-inforcing material 46.

When using the cement-sodium silicate complex coating, the glass fabric re-inforcing material may be substituted for the asbestos. On the other hand, the glass fabric re-inforcing material is not suitable for use with a frit.

The honeycomb core 51 is rigid and cannot be readily shaped. Further, the faces thereof will be planar. Accordingly, the use of the honeycomb 51 is primarily limited to the formation of panels, since it is not readily adaptable to compound contours, such as that shown in FIGURE 6.

In the use of the honeycomb core 51, suitable facing layers will be applied thereto and bonded thereto in any desired suitable manner.

From the foregoing, it will be seen that novel and advantageous provision has been made for carrying out the desired ends. However, attention is again directed to the fact that variations may be made in the example method and apparatus disclosed herein without departing from the spirit and scope of the invention, as defined in the appended claim.

I claim:

A method of forming a ceramic honeycomb panel having compound face surfaces and being of the type including a pair of facing layers formed primarily of ceramic and a honeycomb core disposed therebetween, said method comprising the steps of shaping the facing layers to the desired surface configurations, extruding and cutting to length ceramic tubes, inserting the tubes between the facing layers in end-to-face relation therewith and in contiguous relation with one another to form a honeycomb core, and firing said tubes and said facing layers at the vitrification temperature thereof to self bond said tubes to one another and to the facing layers.

References Cited in the file of this patent

UNITED STATES PATENTS

| | | |
|---|---|---|
| 1,795,200 | Crossley | Mar. 3, 1931 |
| 2,227,770 | Ungewiss | Jan. 7, 1941 |
| 2,304,562 | Gerisch | Dec. 8, 1942 |
| 2,369,006 | Banks | Feb. 6, 1945 |
| 2,477,852 | Bacon | Aug. 2, 1949 |
| 2,545,805 | Callender | Mar. 20, 1951 |
| 2,599,268 | Maculan | June 3, 1952 |
| 2,682,491 | Hahn | June 29, 1954 |
| 2,828,235 | Holland et al. | Mar. 25, 1958 |
| 2,837,779 | Jacobs | June 10, 1958 |
| 2,910,396 | Randall et al. | Oct. 27, 1959 |
| 2,931,142 | Veres | Apr. 5, 1960 |

FOREIGN PATENTS

| | | |
|---|---|---|
| 613,529 | Great Britain | Nov. 30, 1948 |
| 487,972 | Canada | Nov. 11, 1952 |